(12) United States Patent
Yu et al.

(10) Patent No.: US 10,942,059 B2
(45) Date of Patent: Mar. 9, 2021

(54) ONLINE MONITORING METHOD FOR METERING PERFORMANCE OF DIAPHRAGM GAS METER

(71) Applicant: Weihai Zhuocheng Gas Safety Device Co., Ltd., Weihai (CN)

(72) Inventors: Changsong Yu, Weihai (CN); Changjiang Li, Weihai (CN); Guoyong Cheng, Weihai (CN); Rongshu Li, Weihai (CN)

(73) Assignee: Weihai Zhuocheng Gas Safety Device Co., Ltd., Shangdong (CN)

( * ) Notice: Subject to any disclaimer, the term of this patent is extended or adjusted under 35 U.S.C. 154(b) by 201 days.

(21) Appl. No.: 16/180,367

(22) Filed: Nov. 5, 2018

(65) Prior Publication Data
US 2020/0003606 A1 Jan. 2, 2020

(30) Foreign Application Priority Data
Jul. 2, 2018 (CN) .......................... 201810709540.5

(51) Int. Cl.
*G01F 25/00* (2006.01)
*G01F 3/22* (2006.01)

(52) U.S. Cl.
CPC .......... *G01F 25/0053* (2013.01); *G01F 3/225* (2013.01)

(58) Field of Classification Search
CPC ................................. G01F 3/225; G01F 3/228
See application file for complete search history.

(56) References Cited

U.S. PATENT DOCUMENTS

| | | | | |
|---|---|---|---|---|
| 4,910,519 A * | 3/1990 | Duell | ........................ | G01F 1/08 341/157 |
| 6,333,626 B1 * | 12/2001 | Edwards | ............... | G01D 5/2515 324/110 |
| 6,453,721 B1 * | 9/2002 | Grzeslo | ................... | G01F 15/04 73/1.16 |
| 9,528,903 B2 * | 12/2016 | Zusman | .................. | F16L 55/28 |
| 2007/0272031 A1 * | 11/2007 | Koba | ...................... | G01F 3/227 73/861.21 |
| 2009/0153357 A1 * | 6/2009 | Bushman | .............. | G01F 15/063 340/870.02 |
| 2011/0066297 A1 * | 3/2011 | Saberi | ................... | F16K 31/046 700/287 |
| 2015/0137989 A1 * | 5/2015 | Park | ........................ | G01F 3/227 340/870.02 |

* cited by examiner

*Primary Examiner* — Paul M. West
*Assistant Examiner* — Mark A Shabman
(74) *Attorney, Agent, or Firm* — Muncy, Geissler, Olds & Lowe, P.C.

(57) ABSTRACT

The present invention discloses an online method for metering performance of a diaphragm gas meter. A magnetic turntable in an electromechanical conversion device is reasonably segment and motion information of each segment is recorded and analyzed. Every time when the diaphragm gas meter discharges gas of a rotary volume, a rotating shaft of a meter core rotates a circle. The magnetic turntable is meshed with a driving gear output by the rotating shaft in the meter or output by the rotating shaft outside the meter to ensure that the magnetic turntable rotates a circle every time when the diaphragm gas meter discharges a rotary volume. The present invention is significant for error management of the gas meter and intelligent control and gas utilization safety management of a gas user.

12 Claims, 5 Drawing Sheets

ONLINE MONITORING METHOD FOR METERING PERFORMANCE OF DIAPHRAGM GAS METER

TECHNICAL FIELD

The present invention relates to the technical field of gas metering, in particular to an online monitoring method for metering performance of a diaphragm gas meter.

BACKGROUND ART

A gas metering device, called a gas meter (diaphragm meter) or a gas flowmeter, is used for accumulating a volume or mass of gas passing through a pipeline. At present, a household gas metering instrument mostly adopts a diaphragm gas meter or an intelligent gas meter with a diaphragm gas meter as a main body. None of the meters of the two types have functions of judging their own meter performance, monitoring gas channeling and leakage of cavities in the meters and the like. With increase of service time of a gas meter, aging and frictional loss of a diaphragm of a meter core and a slide valve may result in the problems of, for example, prolonging of a movement distance of the diaphragm, perforation of the diaphragm, non-tight sealing of the slide valve and a valve seat and gas channeling in a cavity.

Some intelligent gas meters have a gas leakage detection function. However, interfaces are usually reserved in the meters and the meters cooperate with external indoor gas leakage alarms to monitor leakage of a gas pipeline to achieve the purpose of closing a valve in the gas meter in case of gas leakage. The problem of leakage in a gas meter still cannot be solved.

For intellectualization reconstruction of a diaphragm gas meter, electromechanical conversion is one of the most important projects. At present, electromechanical conversion of a diaphragm gas meter mostly adopts a manner of adding a reed switch on a counter print wheel outside the meter. A magnet is arranged on a single or tens print wheel. Every time when the print wheel rotates a circle, the reed switch outputs a counting pulse. The pulse equivalent is one pulse per 10 L or one pulse per 100 L and a metering resolution is low. In addition, actions of the reed switch are determined by an intensity of an external magnetic field and its service life is greatly limited by switch actions.

Therefore, how to provide an online monitoring method for metering performance of a diaphragm gas meter to implement online self-detection of the meter performance and active gas leakage safety management is a problem to be solved in the present invention.

At present, some intelligent gas meter and electromechanical conversion device patents which have been disclosed have the following problems.

1: A gas meter and a counter electromechanical conversion device thereof are disclosed in Chinese patents CN 106248162 and CN 206038080. The electromechanical conversion device is mounted at the top of a counter outside the gas meter. A width of an electrochemical conversion output pulse is mainly extended, but an electromechanical conversion resolution cannot be really increased.

2: An Internet of things gas meter is disclosed in Chinese patent CN 107340023. A sensor module is mounted in a basic meter and a magnitude of a difference between inner and outer pressure of the gas meter is obtained by comparison to judge whether external leakage occurs to the gas meter or not. Reduction in own metering performance of the meter is not reflected in the patent.

3: A composite Internet of things-based gas meter failure prompting method and an Internet of things system are disclosed in Chinese patent CN 107707386. The emphasis is laid upon solving simple problems of a gas meter by a user under coordination of the Internet of things system. In the patent, the gas meter detects its own running state information in real time to judge whether it has a failure or not. Only monitoring of simple power supply failures such as under-voltage of a battery of the gas meter and poor contact of a cathode and anode of the battery is involved and self-detection of deep-seated failures such as reduction in metering performance of the meter and slight leakage is not reflected.

SUMMARY OF THE INVENTION

The Technical Problem to be Solved

For the shortcomings of the prior art, the present invention provides an online monitoring method for metering performance of a diaphragm gas meter. A magnetic turntable of an electromechanical conversion device is reasonably segmented and motion information of each segment is recorded and analyzed. According to the present invention, properties of equipment are pertinently matched, thereby implementing qualitative and quantitative judgment in metering errors of the diaphragm gas meter, internal leakage judgment, external leakage judgment and safety judgment for a constant flow rate and providing a reliable guarantee for online error management of the gas meter and active gas safety management.

Technical Solutions

In order to achieve the foregoing purpose, the present invention is implemented through the following technical solution: an online monitoring method for metering performance of a diaphragm gas meter is provided. A magnetic turntable in an electromechanical conversion device is reasonably segmented and motion information of each segment is recorded and analyzed, so as to implement judgment in metering performance reduction of the diaphragm gas meter and qualification and quantization of internal and external leakage. Every time when the diaphragm gas meter discharges gas of a rotary volume, a rotating shaft of a meter core rotates a circle. The electrochemical conversion device is selectively mounted in or outside the gas meter and is directly meshed with a driving gear output by the rotating shaft in the meter or output by a conversion rotating shaft outside the meter to ensure that the magnetic turntable rotates a circle every time when the diaphragm gas meter discharges a rotary volume. The number of electrical pulse signals output by the electromechanical conversion device is determined by the number of magnets mounted on the magnetic turntable.

A quantitative and qualitative analysis method for online failure monitoring such as judgment in metering performance reduction of the diaphragm gas meter and slight internal leakage judgment includes: segmenting the magnetic turntable and performing analysis according to a ratio of a pulse signal output period of a certain segment to a period for output of gas of a rotary volume by the gas meter.

As a further preferred technical solution of the present invention, the electromechanical conversion device converts each rotary volume period of the gas meter to output more than two electrical pulse signals, so that the metering resolution of the gas meter is increased and accurate flow analysis under a minimum flow of the gas meter may be implemented. On the basis of accurately metering a micro flow, one-time gas consumption is set for constant flow rate judgment and safety prevention of external leakage hidden dangers of the meter.

As a further preferred technical solution of the present invention, the electromechanical conversion device includes a transmission gear, a bracket, the magnetic turntable, a magnetic switch Printed Circuit Board (PCB) and the magnets, and an adopted electromechanical conversion component may be a magnetic switch, a reed switch, a photoelectric direct-reading module, a touch switch and the like. As a further preferred technical solution of the present invention, no matter whether the electromechanical conversion device is mounted in or outside the meter, rotation of the magnetic turntable for a circle corresponds to discharge of the gas of a rotary volume by the gas meter, i.e., a discharge period, a plurality of symmetric circular grooves are formed in a turntable plane of the magnetic turntable and the magnets may be embedded in the circular grooves.

As a further preferred technical solution of the present invention, the electromechanical conversion device is mounted in a cavity of a gas meter housing, a meter core in the cavity of the gas meter is provided with a diaphragm rotating shaft and a diaphragm rotating shaft gear is arranged on the diaphragm rotating shaft. The transmission gear is meshed with the diaphragm rotating shaft gear, the magnets are arranged on the magnetic turntable, the magnetic switch is welded on the magnetic switch PCB, and the magnetic switch PCB is perpendicularly mounted on the bracket and is parallel to the plane of the magnetic turntable.

As a further preferred technical solution of the present invention, the electromechanical conversion device (5) is mounted outside the cavity of the gas meter housing (2), a metering bin (1) is arranged outside the gas meter and a counter (11) and an outer driving gear (12) directly magnetically coupled to the diaphragm rotating shaft gear in the meter core (3) are arranged in the metering bin (1). The magnetic turntable (53) is embedded onto the outer driving gear (12) and rotates coaxially. The bracket (52) is fixedly mounted on the counter (11) and the magnetic switch PCB (54) is perpendicularly mounted on the bracket (52) and is parallel to the plane of the magnetic turntable (53).

Beneficial Effects

The online monitoring method for the metering performance of the diaphragm gas meter provided by the present invention has the following beneficial effects.

According to the online monitoring method for the metering performance of the diaphragm gas meter, the metering accuracy of a flow below the minimum flow of the gas meter is improved, more accurate bases are provided for active safety management such as qualitative and quantitative judgment in own metering errors of the diaphragm gas meter, internal leakage judgment, external leakage judgment and safety judgment for the constant flow rate, and the method is significant for intelligent control and gas utilization safety management of the meter.

In the figures: 1—metering bin; 2—meter housing; 3—meter core; 5—electromechanical conversion device; 11—counter; 12—outer driving gear; 34—diaphragm rotating shaft; 36—metering box; 51—transmission gear; 52—bracket; 53—magnetic turntable; 54—magnetic switch PCB; 55—magnet; and 531—circular groove.

DETAILED DESCRIPTION OF THE INVENTION

The technical solutions in the embodiments of the present invention will be clearly and completely described below in combination with the drawings in the embodiments of the present invention. It is apparent that the described embodiments are not all the embodiments but only part of embodiments of the present invention. All other embodiments obtained by those of ordinary skill in the art on the basis of the embodiments in the present invention without creative work shall fall within the scope of protection of the present invention.

Referring to FIG. 1-5, the embodiments of the present invention provide two technical solutions.

Embodiment 1

Figure 1:
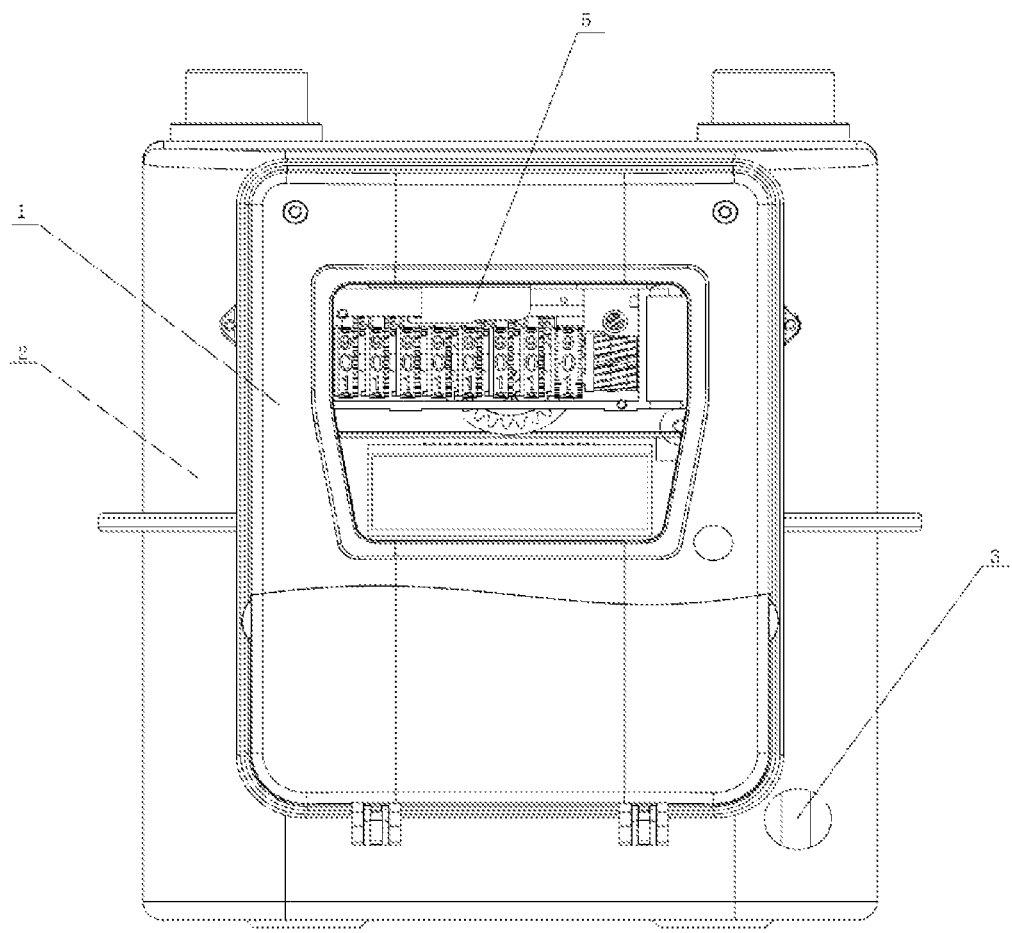
FIG. 1 is a mounting schematic diagram of an externally mounted electromechanical conversion device according to the present invention.

According to an online monitoring method for the metering performance of a diaphragm gas meter, an electromechanical conversion device 5 is mounted outside a cavity of a gas meter housing 2 (as shown in FIG. 1). A metering bin 1 is arranged outside the gas meter. A counter 11 and an outer driving gear 12 directly magnetically coupled to a diaphragm rotating shaft gear in a meter core 3 are arranged in the metering bin 1. A magnetic turntable 53 is embedded onto the outer driving gear 12 and rotates coaxially. A bracket 52 is fixedly mounted on the counter 11. A magnetic switch PCB 54 is perpendicularly mounted on the bracket 52 and is parallel to a plane of the magnetic turntable 53. Magnets 55 are arranged on the magnetic turntable 53. A magnetic switch is welded on the magnetic switch PCB 54.

Figure 2:
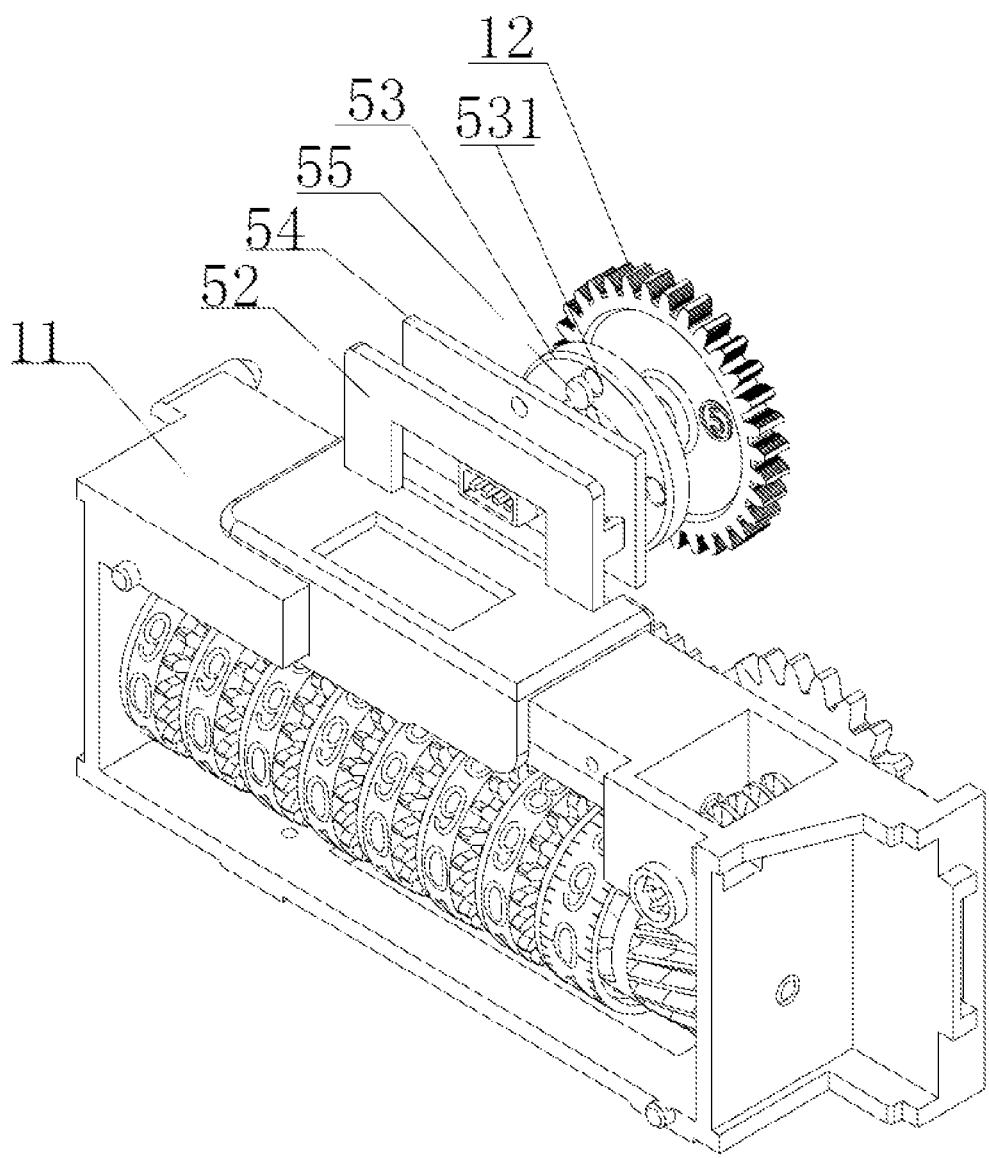
FIG. 2 is a structure diagram of an externally mounted electromechanical conversion device according to the present invention.

The electromechanical conversion device 5 (as shown in FIG. 2) includes the bracket 52, the magnetic turntable 53, the magnetic switch PCB 54 and the magnets 55.

Rotation of the magnetic turntable 53 for a circle corresponds to discharge of gas of a rotary volume by the gas meter, i.e., a discharge period. A plurality of symmetric circular grooves 531 are formed in the turntable plane of the magnetic turntable 53 and the magnets 55 may be embedded into the circular grooves 531. The magnetic switch PCB 54 is embedded into the front end of the bracket 52 and is parallel to the plane of the magnetic turntable 53. When a magnet 55 rotates to be dead against the magnetic switch, the magnetic switch outputs a pulse signal. The number of pulse signals output by a metering box every time when a rotary volume is discharged is determined by the number of the magnets arranged on the magnetic turntable 53.

The magnetic turntable 53 in the electromechanical conversion device 5 is reasonably segmented and motion information of each segment is recorded and analyzed, so as to implement qualitative and quantitative judgment analysis such as judgment in metering performance reduction of the diaphragm gas meter and slight leakage judgment.

The electromechanical conversion device 5 converts each rotary volume period of the gas meter to output more than two electrical pulse signals for metering accuracy judgment, constant flow rate judgment and safety prevention of external leakage hidden dangers of the meter.

Rotation of the magnetic turntable 53 for a circle corresponds to discharge of gas of a rotary volume by the gas meter, i.e., the discharge period. The symmetric circular grooves 531 are formed in the turntable plane of the magnetic turntable 53 and the magnets 55 may be embedded into the circular grooves 531. When a magnet 55 rotates to be dead against the magnetic switch, the magnetic switch outputs a pulse signal. The number of the pulse signals output by the metering box every time when a rotary volume is discharged is determined by the number of the magnets arranged on the magnetic turntable 53.

The gas meter is a gas meter commonly used in life at present and will not be elaborated in the present application. The gas meter mainly includes components such as the metering bin 1, the meter housing 2 and the meter core 3. The meter core 3 is arranged in the gas meter. The meter core 3 mainly includes components such as a diaphragm rotating shaft 34 and the metering box 36.

Embodiment 2

Figure 3:
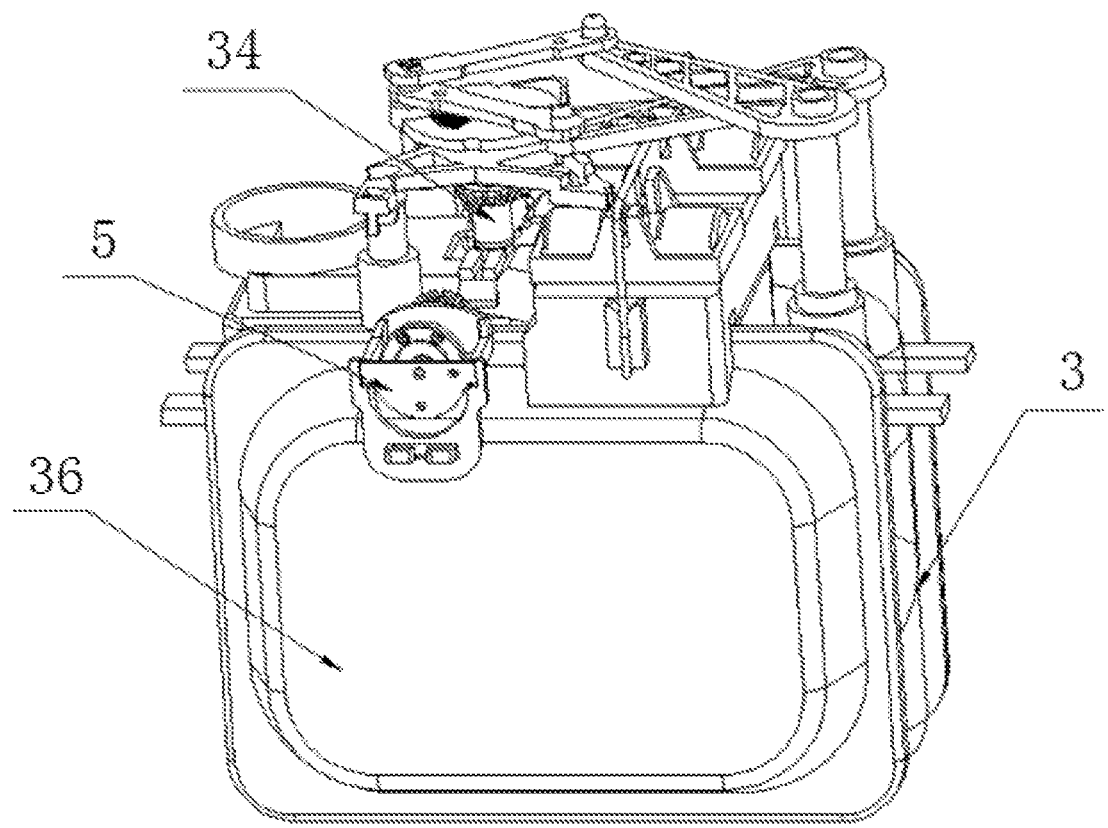
FIG. 3 is a mounting schematic diagram of an internally mounted electromechanical conversion device according to the present invention.

According to an online monitoring method for the metering performance of a diaphragm gas meter, an electromechanical conversion device 5 is mounted in a cavity of a gas meter housing 2 (as shown in FIG. 3). A meter core 3 in the cavity of the gas meter is provided with a diaphragm rotating shaft 34 and a diaphragm rotating shaft gear is arranged on the diaphragm rotating shaft 34. A transmission gear 51 is meshed with the diaphragm rotating shaft gear. Magnets 55 are arranged on a magnetic turntable 53. A magnetic switch is welded on a magnetic switch PCB 54. The magnetic switch PCB 54 is perpendicularly mounted on a bracket 52 and is parallel to a plane of the magnetic turntable 53.

Figure 4:
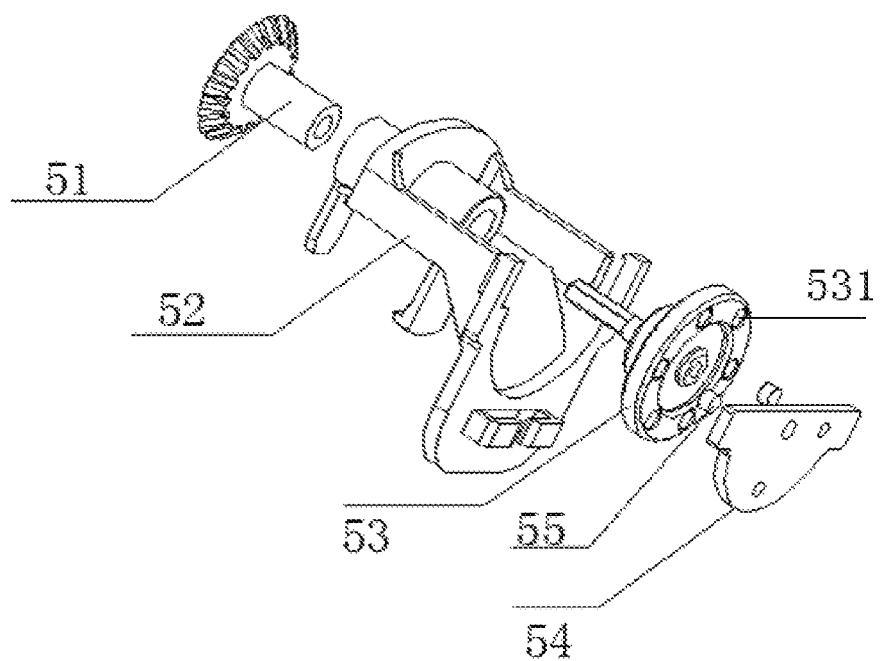
FIG. 4 is a structure diagram of an internally mounted electromechanical conversion device according to the present invention.

The electromechanical conversion device 5 (as shown in FIG. 4) includes the transmission gear 51, the bracket 52, the magnetic turntable 53, the magnetic switch PCB 54 and the magnets 55. Rotation of the magnetic turntable 53 for a circle corresponds to discharge of gas of a rotary volume by the gas meter, i.e., a discharge period. A plurality of symmetric circular grooves 531 are formed in the turntable plane of the magnetic turntable 53 and the magnets 55 may be embedded into the circular grooves 531. The magnetic switch PCB 54 is embedded into the front end of the bracket 52 and is parallel to the plane of the magnetic turntable 53. When a magnet 55 rotates to be dead against the magnetic switch, the magnetic switch outputs a pulse signal. The number of pulse signals output by a metering box every time when a rotary volume is discharged is determined by the number of the magnets arranged on the magnetic turntable 53.

The magnetic turntable 53 in the electromechanical conversion device 5 is reasonably segmented and motion information of each segment is recorded and analyzed, so as to implement qualitative and quantitative judgment analysis such as judgment in metering performance reduction of the diaphragm gas meter and slight leakage judgment. The electromechanical conversion device 5 converts each rotary volume period of the gas meter to output more than two electrical pulse signals for metering accuracy judgment, constant flow rate judgment and safety prevention of external leakage hidden dangers of the meter.

Figure 5:
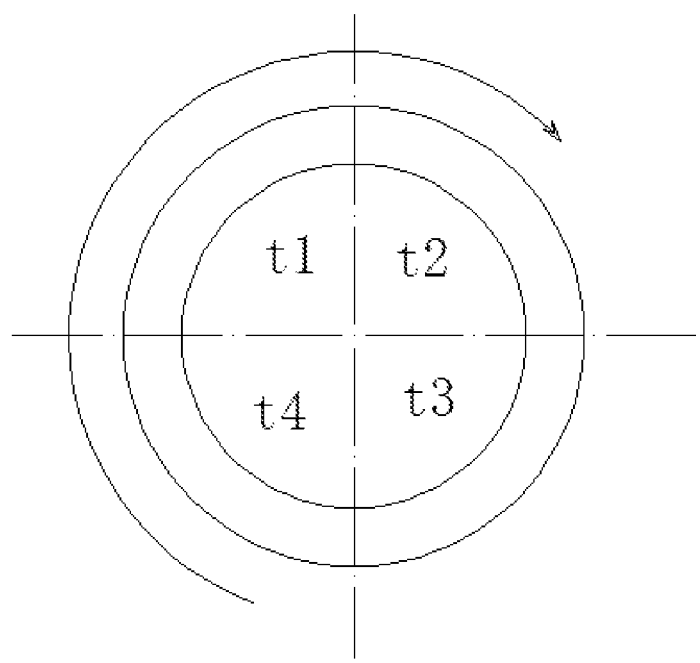
FIG. 5 is a schematic diagram of coordinates when a circumference of a magnetic turntable is quartered according to the present invention.

Qualitative analysis for online failure monitoring such as judgment in metering performance reduction of the diaphragm gas meter and internal leakage judgment is discussed in the present invention only with the condition that a circumference of the magnetic turntable is quartered as an example (as shown in FIG. 5). A time for rotation of the magnetic turntable for a circle is set to be T. Four magnets are assembled at symmetric positions where the circumference of the magnetic turntable is quartered. When the magnets pass through the magnetic switch, four time intervals t (t1, t2, t3 and t4) may be sampled and recorded. A ratio of t to the period T is set to be $\beta1$, $\beta2$, $\beta3$ and $\beta4$. In each rotary volume period, the diaphragm rotating shaft of the meter core of the gas meter rotates at an inconstant speed, so that the magnetic turntable of the electromechanical conversion device also rotates at an inconstant speed. Therefore, values of $\beta1$, $\beta2$, $\beta3$ and $\beta4$ are not all ¼. In case of no leakage occurring to the gas meter, the values of $\beta1$, $\beta2$, $\beta3$ and $\beta4$ are fixed values or slightly fluctuate. In case of leakage or failure occurring to the gas meter, if leakage is distributed not according to an original proportion coefficient when a gas flow is stable (multiple fixed periods are measured), offsets will inevitably exist for the values of the $\beta1$, $\beta2$, $\beta3$ and $\beta4$, and when the offsets reach a certain value, it may be qualitatively judged that internal leakage occurs to the gas meter.

During practical use, in case of leakage occurring to the gas meter, the time interval is generally shorter than ¾ of a rotary volume period. In ¾ of the period when leakage occurs, the value of at least one of t1, t2, t3 and t4 may not be affected by leakage or is slightly affected. If it is measured that time intervals at which the four magnets pass through the magnetic switch are t1', t2', t3' and t4' in case of leakage occurring to the gas meter, $\beta1'$, $\beta2'$, $\beta3'$ and $\beta4'$ may be calculated, and are compared with $\beta1$, $\beta2$, $\beta3$ and $\beta4$ in case of no leakage occurring to the gas meter to find the one with maximum decrease (set to be $\beta4'$, i.e., the time interval minimally affected by leakage), and the normal discharge period $T=t4'/\beta4$ of each rotary volume of the gas meter may be calculated. It is practically measured that the discharge period of each rotary volume of the gas meter is $T'=(t1'+t2'+t3'+t4')$. Accordingly, a period deviation $\Delta T=T'-T$ may be obtained. Then, a ratio of $\Delta T$ to T is a leakage proportion coefficient of the gas meter. When leakage or another metering performance failure occurs to the gas meter, gas loss of a gas company may be calculated through the proportion coefficient.

If quantitative calculation for a leakage condition when the time interval is longer than ¾ of the period is required, it is only necessary to uniquely increase the number of the magnets on the magnetic turntable. In addition, another magnetic switch forming a certain angular relationship with the original magnetic switch may be additionally arranged for reference to the original measured parameter.

The electromechanical conversion device provided by the present invention is required to output more than two electrical pulse signals in each period, and such high-density signals may be used for metering a micro flow below the minimum flow. For a household diaphragm gas meter of which a maximum flow is smaller than 6 $m^3/h$, an electromechanical conversion device outputting two electrical pulse signals in a period is adopted. In the present invention, gas consumption and gas utilization time are set for a constant flow rate to judge and prevent external leakage of the gas meter through the following flow.

In Step 1, for a relatively constant flow rate more than or equal to q3 m³/h and less than or equal to q1 m³/h, one-time gas consumption is not allowed to exceed V1 m³; and values of q1, q3 and V1 are reasonably set according to a space volume of a relatively enclosed gas utilization region, gas utilization characteristics of gas equipment and an explosion lower limit (5%) of methane.

In Step 2, for a relatively constant flow rate higher than q1 m³/h and lower than the maximum flow of the gas meter, it is reasonably determined according to registration information of the gas equipment that the one-time gas consumption is not allowed to exceed V2 m³ and the duration is not allowed to exceed $T_1$.

In Step 3, for a flow between consequent generation of two period signals within 6 hours and q3 m³/h (minimum flow supporting the gas equipment), occurrence of leakage is determined.

The electromechanical conversion device adapted to the present invention is required to output more than two electrical pulse signals in each period, and such a signal density is used for accurate, rapid and reliable constant flow rate judgment and judgment in slight leakage below a starting flow.

From the above, the present invention is significant for metering performance monitoring and local meter detection of the diaphragm gas meter and also for intelligent monitoring and gas utilization safety management of the meter.

It is to be noted that relationship terms such as first and second in the present invention are adopted not always to require or imply existence of any such practical relationship or sequence between entities or operations but only to distinguish one entity or operation from another entity or operation. moreover, terms "include" and "contain" or any other variant thereof is intended to cover nonexclusive inclusions, thereby ensuring that a process, method, object or equipment including a series of elements not only includes those elements but also includes other elements which are not clearly listed or further includes elements intrinsic to the process, the method, the object or the equipment without more restrictions.

Although the embodiments of the present invention have been illustrated and described, those of ordinary skill in the art may know that various variations, modifications, replacements and transformations may be made to these embodiments without departing from the principle and spirit of the present invention. The scope of the present invention is defined by the appended claims and equivalents thereof.

The invention claimed is:

1. An online monitoring method for metering performance of a diaphragm gas meter, comprising:
providing an electromechanical conversion device having a magnetic turntable and a magnetic switch, the magnetic turntable being segmented into a plurality of segments, the plurality of segments each having a magnet;
detecting by the magnetic switch that each magnet passes through the magnetic switch;
recording and analyzing motion information of each of the plurality of segments relative to a predetermined period of time based on the detection by the magnetic switch; and
determining metering errors of the diaphragm gas meter, internal leakage judgment, external leakage judgment and safety judgment for a constant flow rate based on qualitative and quantitative judgement using the analyzed motion information of the each of the plurality of segments.

2. The online monitoring method for the metering performance of the diaphragm gas meter according to claim 1, wherein
recording and analyzing the motion information includes:
determining rotary volume periods from the recorded motion information of each of the plurality of segments;
converting each rotary volume period into an electrical pulse signal; and
outputting more than two electrical pulse signals; and
determining the metering errors of the diaphragm gas meter, the internal leakage judgment, the external leakage judgment and the safety judgment for the constant flow rate includes:
determining a signal density of the outputted more than two electrical pulse signals to perform metering accuracy judgment, constant flow rate judgment and safety prevention of external leakage hidden dangers of the meter.

3. The online monitoring method for the metering performance of the diaphragm gas meter according to claim 1, wherein the electromechanical conversion device comprises a transmission gear, a bracket, the magnetic turntable, a magnetic switch Printed Circuit Board (PCB) that includes the magnetic switch.

4. The online monitoring method for the metering performance of the diaphragm gas meter according to claim 3, wherein the electromechanical conversion device is mounted outside a cavity of a gas meter housing, a metering bin is arranged outside the gas meter, and a counter and an outer driving gear directly magnetically coupled to a diaphragm rotating shaft gear in a meter core are arranged in the metering bin; the magnetic turntable is embedded onto the outer driving gear and rotates coaxially; the bracket is fixedly mounted on the counter, and the magnetic switch PCB is perpendicularly mounted on the bracket and is parallel to the plane of the magnetic turntable; and the magnets are arranged on the magnetic turntable, and the magnetic switch is welded on the magnetic switch PCB.

5. The online monitoring method for the metering performance of the diaphragm gas meter according to claim 3, wherein the electromechanical conversion device is mounted in a cavity of a gas meter housing, a meter core in the cavity of the gas meter is provided with a diaphragm rotating shaft, and the diaphragm rotating shaft gear is arranged on the diaphragm rotating shaft; and the transmission gear is meshed with the diaphragm rotating shaft gear, the magnets are arranged on the magnetic turntable, the magnetic switch is welded on the magnetic switch PCB, and the magnetic switch PCB is perpendicularly mounted on the bracket and is parallel to the plane of the magnetic turntable.

6. The online monitoring method for the metering performance of the diaphragm gas meter according to claim 1, wherein
rotation of the magnetic turntable corresponds to discharge of gas of a rotary volume by the gas meter, a plurality of symmetric circular grooves are formed in a turntable plane of the magnetic turntable, and the magnets are embedded into the circular grooves.

7. The online monitoring method for the metering performance of the diaphragm gas meter according to claim 1, wherein a proportion of rotating time consumption of each of the plurality of segments in a rotating period of the magnetic turntable is compared with predetermined properties, and the metering accuracy judgment and error management of the gas meter are performed based on the comparison.

8. The online monitoring method for the metering performance of the diaphragm gas meter according to claim 1, wherein the electromechanical conversion device includes an electromechanical conversion component, the electromechanical conversion device being a magnetic switch, a reed switch, a photoelectric direct-reading module, or a touch switch.

9. The online monitoring method for the metering performance of the diaphragm gas meter according to claim 1, wherein a maximum flow of the diaphragm gas meter ranges from 0.016 to 160 $m^3/h$.

10. The online monitoring method for the metering performance of the diaphragm gas meter according to claim 1, wherein the external leakage judgement is performed by setting gas consumption and gas utilization time for a constant flow rate, the gas consumption and the gas utilization time for the constant flow rage being set by the following steps:
   Step 1: for a relatively constant flow rate more than or equal to a first flow value and less than or equal to a second flow value, setting that one-time gas consumption is not allowed to exceed a first gas consumption value; and setting values of the first flow value, the second flow value and the first gas consumption value according to a space volume of a relatively enclosed gas utilization region, gas utilization characteristics of gas equipment and an explosion lower limit of methane;
   Step 2: for a relatively constant flow rate higher than the second flow value and lower than a maximum flow of the gas meter, determining according to registration information of the gas equipment that the one-time gas consumption is not allowed to exceed a second gas consumption value and the duration is not allowed to exceed a discharge period; and
   Step 3: for a flow between consequent generation of two period signals within 6 hours and the first flow value, determining occurrence of leakage.

11. The online monitoring method for the metering performance of the diaphragm gas meter according to claim 10, wherein the first flow value is a minimum flow supporting the gas equipment.

12. An online monitoring method for metering performance of a diaphragm gas meter, comprising:
   providing a magnetic turntable in an electromechanical conversion device, the magnetic turntable being segmented into a plurality of segments;
   recording and analyzing motion information of each of the plurality of segments; and
   determining metering errors of the diaphragm gas meter, internal leakage judgment, external leakage judgment and safety judgment for a constant flow rate based on qualitative and quantitative judgement using the analyzed motion information of the each of the plurality of segments, wherein
   the external leakage judgement is performed by setting gas consumption and gas utilization time for a constant flow rate, the gas consumption and the gas utilization time for the constant flow rage being set by the following steps:
   Step 1: for a relatively constant flow rate more than or equal to a first flow value and less than or equal to a second flow value, setting that one-time gas consumption is not allowed to exceed a first gas consumption value; and setting values of the first flow value, the second flow value and the first gas consumption value according to a space volume of a relatively enclosed gas utilization region, gas utilization characteristics of gas equipment and an explosion lower limit of methane;
   Step 2: for a relatively constant flow rate higher than the second flow value and lower than a maximum flow of the gas meter, determining according to registration information of the gas equipment that the one-time gas consumption is not allowed to exceed a second gas consumption value and the duration is not allowed to exceed a discharge period; and
   Step 3: for a flow between consequent generation of two period signals within 6 hours and the first flow value, determining occurrence of leakage.

\* \* \* \* \*